United States Patent [19]
Tomlinson

[11] Patent Number: 5,952,049
[45] Date of Patent: Sep. 14, 1999

[54] CONVERSION COATINGS FOR METALS USING GROUP IV-A METALS IN THE PRESENCE OF LITTLE OR NO FLUORIDE AND LITTLE OR NO CHROMIUM

[75] Inventor: Charles E. Tomlinson, Martinsville, Ind.

[73] Assignee: Natural Coating Systems, LLC, Martinsville, Ind.

[21] Appl. No.: 09/013,368

[22] Filed: Jan. 26, 1998

Related U.S. Application Data

[63] Continuation-in-part of application No. 08/723,464, Oct. 9, 1996, Pat. No. 5,759,244.

[51] Int. Cl.$^6$ .............................. B05D 1/38; B05D 7/16; C23C 22/48

[52] U.S. Cl. .................... 427/327; 148/247; 427/305; 427/309; 427/328; 427/353; 427/372.2; 427/388.4; 427/405; 427/409; 427/419.2; 427/436; 427/470

[58] Field of Search ...................................... 427/458, 470, 427/299, 307, 309, 327, 409, 437, 419.2, 419.3, 419.5, 419.8, 305, 328, 353, 372.2, 405, 436, 388.4; 148/247

[56] References Cited

U.S. PATENT DOCUMENTS

| | | |
|---|---|---|
| 3,123,452 | 3/1964 | Harris et al. . |
| 3,864,139 | 2/1975 | Heller ...................................... 427/301 |
| 3,864,163 | 2/1975 | Beer . |
| 4,338,140 | 7/1982 | Reghi ................................. 148/6.14 R |
| 4,462,842 | 7/1984 | Uchiyama et al. ................. 148/6.15 R |
| 4,470,853 | 9/1984 | Das et al. ........................... 148/6.15 Z |
| 4,614,607 | 9/1986 | Loch ........................................ 252/142 |
| 4,863,706 | 9/1989 | Wada et al. .............................. 423/277 |
| 5,034,358 | 7/1991 | MacMillan .............................. 501/106 |
| 5,266,358 | 11/1993 | Uemura et al. .......................... 427/387 |
| 5,346,722 | 9/1994 | Beauseigneur et al. ................ 427/299 |
| 5,380,374 | 1/1995 | Tomlinson .............................. 148/247 |
| 5,385,655 | 1/1995 | Brent et al. ............................. 427/417 |
| 5,397,390 | 3/1995 | Gorecki ............................. 106/287.11 |
| 5,578,176 | 11/1996 | Hardee et al. ........................... 427/327 |
| 5,662,746 | 9/1997 | Affinito .................................... 148/247 |
| 5,711,996 | 1/1998 | Claffey .................................... 427/409 |
| 5,789,085 | 8/1998 | Blohowiak et al. ..................... 427/387 |

FOREIGN PATENT DOCUMENTS

| | | |
|---|---|---|
| 1 504 494 | 3/1978 | United Kingdom . |
| 2 084 614 | 4/1982 | United Kingdom . |

OTHER PUBLICATIONS

Connick et al., *J. Am. Chem. Soc. vol. 71*, The Aqueous Chemistry of Zirconium (Sep. 1949), pp. 3182–3184, 3186–3187, and 3190–3191.

Nebergall et al., *General Chemistry 6$^{th}$ Ed.*, Covalent and Ionic Radii of the Elements (1980) (no month).

Lewis Research Center, *NASA Tech Briefs*, Materials (Jan. 1998), p. 68.

Thomas et al., *J. Am. Chem. Soc. vol. 57*, Basic Zirconium Chloride Hydrosols (1935), Oct., pp. 1825–1828.

(List continued on next page.)

*Primary Examiner*—Diana Dudash
*Attorney, Agent, or Firm*—Leydig, Voit & Mayer, Ltd

[57] ABSTRACT

Processes for producing improved environmental protection, corrosion resistance and improved paint adhesion for metals; e.g., ferrous, aluminum, or magnesium alloys; and other surfaces upon contact is disclosed. The processes comprise use of one or more Group IV-A metals such as zirconium in an acidic solution with one or more oxyanions or other non-fluoanions to stabilize and solubilize the metal while fluorides are specifically excluded from the processes and compositions. The processes optionally contain pretreatment stages that serve to activate a surface and/or promote formation of a Group IV-A metal oxide matrices through use of an oxygen donor. The compositions are at a pH below about 5.0 and is preferably in a range between about 1.0 and about 4.0. The coatings may contain surfactants, sequestering agents, or organic additives for improved corrosion protection and paint adhesion. The substrate may be treated by immersion, spray, fogging or rollcoat.

26 Claims, 1 Drawing Sheet

OTHER PUBLICATIONS

Tomlinson, *Cadmium and Chromium Alternatives: An Information Exchange*, (Nov. 5–7, 1997) p. 30.

Kendig et al., *Corrosion Science*, vol. 34, No. 1, The Mechanism of Corrosion Inhibition by Chromate Conversion Coatings from X–Ray Absorption Near Edge Spectroscopy (XANES), pp. 41–49, 1993 (No Month).

Figure 1 schematically illustrates attachment/activation of zirconate to aluminum oxide.
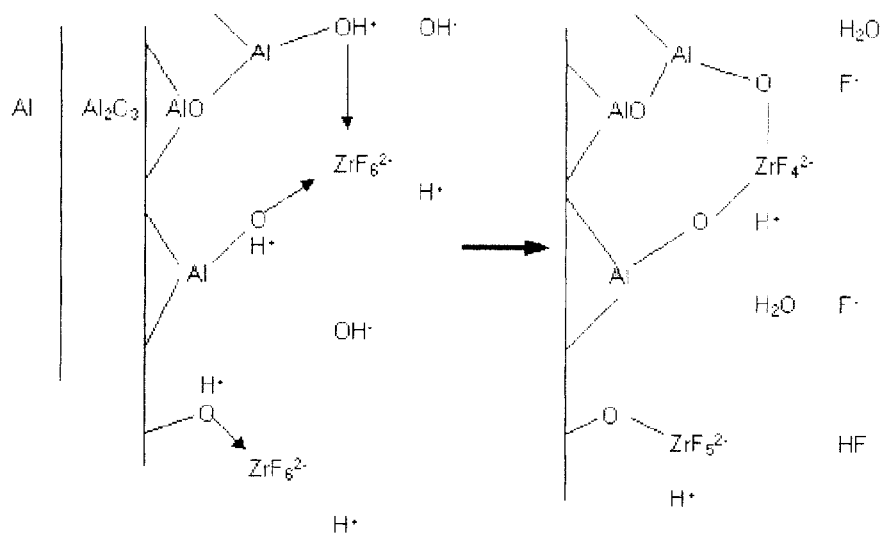

CONVERSION COATINGS FOR METALS USING GROUP IV-A METALS IN THE PRESENCE OF LITTLE OR NO FLUORIDE AND LITTLE OR NO CHROMIUM

CROSS-REFERENCE TO RELATED APPLICATIONS

The present application is a continuation-in-part of application Ser. No. 08/723,464 filed Oct. 9, 1996, now U.S. Pat. No. 5,759,244.

FIELD OF THE INVENTION

The present invention relates generally to conversion coatings for metal surfaces, and more particularly to coatings that are particularly useful for steel, magnesium and aluminum surfaces.

BACKGROUND AND SUMMARY OF THE INVENTION

In recent years a need has arisen for coating compositions that will function to replace chromates in metal treatment. This is due to the detrimental health and environmental impact that has been determined to be associated with chromium compounds.

Many chromate-free chemical conversion coatings for metal surfaces are known to the art. These are designed to render a metal surface "passive" (or less "reactive" in a corrosive environment), leaving the underlying metal protected from the environment. Coatings of this type that produce a corrosion resistant outer layer on the base metal or its oxide often simultaneously produce a surface with improved paint adhesion. Conversion coatings may be applied by a no-rinse process, in which the substrate surface is treated by dipping, spraying, or roll coating. The coatings may also be applied in one or more stages that are subsequently rinsed with water to remove undesirable contaminants.

Several metal and metaloid elements will form a continuous three-dimensional polymeric metal- or metaloid-oxide matrix from aqueous solutions. Chromium shares this characteristic along with silicon and other elements. The Group IV-A elements are attractive candidates for chromate replacement technologies as are the stannates as they share the virtue of being relatively innocuous environmentally and have common valences of +4, facilitating the formation of three dimensional amorphous coatings.

Chromate-free conversion coatings are generally based on chemical mixtures that in some fashion will react with the substrate surface and bind to it to form protective layers. The layer or layers may yield protection through galvanic effects or through simply providing a physical barrier to the surrounding environment.

Many of these conversion coatings have been based on Group IV-A metals such as titanium, zirconium and hafnium, a source of fluoride and a mineral acid for pH adjustment. The fluoride has heretofore generally been considered to be necessary to maintain the Group IV-A metal in solution as a complex fluoride. The fluoride may also serve to keep dissolved substrate metal ions (such as aluminum) in solution.

For example, U.S. Pat. No. 4,338,140 to Reghi discloses a coating for improved corrosion resistance with solutions containing zirconium, fluoride and tannin compounds at pH values from 1.5 to 3.5. Optionally, the coating may contain phosphate ions. U.S. Pat. No. 4,470,853 to Das is related to a coating composition comprised of zirconium, fluoride, tannin, phosphate, and zinc in the pH range of 2.3 to 2.95. According to Das, it is important that approximately 10 atomic percent of zirconium-zirconium oxide be present in the coating to obtain "TR-4" corrosion resistance. It was shown that coatings of higher zirconium oxide content produced excellent corrosion resistance. Compositions which gave higher zirconium oxide on the surface were preferred in the disclosures.

U.S. Pat. No. 4,462,842 to Uchiyama and U.S. Pat. No. 5,380,374 to Tomlinson disclose zirconium treatments in solutions containing fluorides which are followed by treatment with silicate solutions. This combination is suggested to form zirconate and syloxyl linkages (—O—Zr—O—Si—O—Si— . . . ), yielding a coating with improved corrosion resistance over the zirconium treatment alone. Coatings of this type give excellent corrosion protection but very poor paint adhesion.

U.S. Pat. No. 4,863,706 to Wada discloses a process for producing sols and gels of zirconium and a process for producing zirconia. The processes described include reactions to produce basic boratozirconium and basic boratozirconium chloride sols. These are disclosed to be used in producing boratozirconium and boratozirconium chloride gels. A further object of the disclosure is to describe a method for producing zirconia from the gels at relatively low temperature. The essential components of the invention include a boron compound along with a polyvalent metal, zirconium and chloride.

U.S. Pat. No. 5,397,390 to Gorecki discloses an adhesion promoting rinse containing zirconium in combination with one or more organosilanes and fluoride. The compositions are used to rinse surfaces after they have been treated in a phosphating bath. The zirconium ion concentration is selected to maintain pH in a broad range as the silanes deposit on the substrate to promote paint adhesion and improve corrosion resistance. Organosilanes are necessary components of the disclosed compositions. Additionally, in preparing the compositions, Gorecki indicates that whenever zirconium-containing salts such as zirconium basic carbonate, zirconium hydroxychloride and zirconium oxychloride are used as a source (of zirconium) the salts must be dissolved in 50% hydrofluoric acid in order to effect dissolution. Gorecki does not indicate a necessity to dissolve the fluorozirconate salts mentioned in his disclosure. This demonstrates that fluoride is a necessary component of the disclosed compositions as it is included as part of the fluorozirconate salts or from hydrofluoric acid. Compositions of this nature are among the group of fluorozirconates which are referred to herein below as useful for "activating or activation" of a surface prior to application of the present invention.

Brit. Pat. 1,504,494 to Matsushima describes a process for treating metal surfaces using zirconium at a pH above 10.0. A zirconate coating is formed but the pH of the solution is maintained above the present invention.

It can be seen from the foregoing that the compositions of the prior art have not used Group IV-A metals in an aqueous, non-organic solvent containing systems that exclude fluoride specifically. Additionally, the prior art does not show formation and attachment of zirconate gels from aqueous solution without using organic solvents. Sol-gels are macromolecular units rather than discrete atoms or molecular units and are typically prepared from metal-alkoxy precursors in solvent-based solutions that are unstable in water.

The present invention employs an organic or inorganic oxyanion and certain nonoxy-anions to stabilize zirconium ions in an aqueous acidic solution with subsequent exposure of a metal substrate to the solution and with subsequent drying to produce a barrier of zirconium oxide coating. The prior art has demonstrated the usefulness of fluoride in compositions containing Group IV-A metals but has not shown the advantages of its exclusion from compositions containing these metals. Many health and environmental benefits of eliminating fluoride have been addressed in systems based on chemistries other than those of the Group IV-A metals. Examples are described in UK Pat. Application 2,084,614 by Higgins.

In the present invention, the zirconium (or other Group IV-A element) atoms are believed to bond to active oxygen atoms on the substrate surface, leading to a thin zirconate film forming from a reaction analogous to the reaction of silicates. Without rinsing the substrate before drying, the zirconate in the coating solution carried out with the substrate will bond to the thin film upon drying. Whereas silica "gels" form from alkaline solutions upon exposure to an acidic surface or one high in mono- and polyvalent cations, zircon "gels" will form on surfaces which are acidic or basic and those high in mono- and polyvalent cations. Upon drying at room or elevated temperature, a continuous polymeric zirconium oxide becomes fixed on the surface.

The present compositions and processes will give improved corrosion protection over zirconates containing fluoride in a ratios of greater than 2 fluoride atoms per zirconium atom. This is believed to be due to the fluoride competing with oxygen for bonding to zirconium in the matrix. With an atomic ratio of fluoride to zirconium at or between two to one and zero to one, the probability that all zirconium atoms will incorporate in the coating as a second or higher order oxide is very high. The term "order" is used here to describe the number of bonds a given Group IV-A element has to another element such as oxygen or fluorine; i.e. a second order zirconium fluoride has zirconium bonded to two fluorine atoms, a third order zirconium-oxygen compound has three zirconium to oxygen bonds, etc. With no fluoride present to compete with the oxygen, a three-dimensional zirconyl matrix with each zirconium atom bonded with up to four oxygen atoms will be established. Naturally occurring zirconates having this character are among the hardest, oldest and most stable inorganic compounds known. Studies by Connick and McVey (J. Am. Chem. Soc., Vol. 71, 1949, pp. 3182–3191) demonstrated that fluoride complexes of zirconium are far more stable than any other complexes (oxyanion and chloride) in their studies. It is this high stability of the fluocomplexes which interferes with Group IV-A oxide polymer formation. Its presence diminishes the Group IV-A to oxygen bond density (number per unit volume) and thereby decreases the protective ability of the metal oxide film. It is to be noted that Connick and McVey included chloride in the study and found its affinity to be on a par with the nitrate oxyanion. Thomas and Owens (J. Am. Chem. Soc. Vol. 57, 1935, pp.1825–1828) found nitrate and chloride anions to be comparable in many regards in their studies of zirconium hydrosols and developed a hierarchy for the tendency of anions to coordinate with zirconium. Again, fluoride was very high while nitrate and chloride were very low. The only anion stronger than fluoride was hydroxide. In the present invention, the formation of Group IV-A hydroxides is intended with eventual dehydration reactions leading to zirconyl-, titanyl- or hafnyl-oxide matrices.

With regard to nonoxy-anions (such as chloride) which may be suitable for stabilizing Group IV-A metals in aqueous solution yet still allow the formation of a titanyl, zirconyl or hafinyl matrix upon drying, the absolute value of charge to ionic radius ratio is the criterion for inclusion or exclusion in the group of preferred anions.

For example, a monatomic anion such as chloride with a charge of negative one and a radius of 1.81 Angstroms (According to Nebergall, Holtzclaw and Robinson, in: "General Chemistry," Publisher, D. C. Heath and Co., 1980) the value is $|-1/1.81|$ or 0.552. For fluoride, the ratio is $|-1/1.36|$ or 0.735. Therefore, it can be seen that when the ratio is below 0.735, the charge to radius (and therefore, overall atomic or molecular charge distribution) is such that the affinity will be lower than fluoride and acceptable for inclusion in the group of anions. An example of an anion excluded from the group would be sulfide with a charge of –2 and an ionic radius of 1.84 Angstrom units, resulting in a ratio of 1.087. Group IV-A sulfides are very stable and typically relatively insoluble as a result. This results in the exclusion of the $S^{2-}$ anion from the group of preferred nonoxy-anions.

In nonoxy-polyatomic anions, the radius may be considered to be the bond length between a central and periphery atom(s) (three or more atoms in the polyatomic anion) or simply the bond length in a diatomic anion. As with monatomic nonoxy-anions, the ratio of charge to radius determines the suitability for inclusion in the preferred group. Anions with an absolute ratio below 0.735 (charge to radius) are preferred.

The present invention may be used in processes where fluoride is used in preceding stages. This may cause accumulation of fluoride in the compositions of the present invention in some systems during processing. Fluoride may be tolerated in such cases up to a ratio not exceeding two fluoride atoms per Group IV-A atom in solution. It is to be understood that the presence of such fluoride is undesirable for compositions and processes described here but that such systems are still preferred to those with higher fluoride levels. In the prior art, fluoride is typically used at a ratio of at least four fluoride atoms per Group IV-A atom.

It should be further noted that the zirconate coatings containing fluoride are inferior to the same which are subsequently treated with silicate solutions. This indicates the silicate itself is superior to the fluorozirconates for protection and while the fluorozirconates give some benefit, they act primarily as a surface activator and attachment device for the silicate layers.

The present invention will provide improved, highly corrosion resistant conversion coatings based on Group IV-A metals such as zirconium by combining the Group IV-A metal with a stabilizing anion (oxyanions, haloanions and others) other than fluoride in acidic solution. The presence of fluoride in the solution is undesirable but may be tolerated up to a ratio of two fluoride atoms per Group IV-A atom.

In one aspect of the invention, the zirconium content of the solution is 1,000 to 20,000 ppm, 500 to 15,000 ppm nitrate and 1,000 to 7,000 ppm tris(hydroxymethyl)aminomethane; the preferred pH of the solution will be between about 1.0 and 4.0. The coating may optionally include Group IA and/or Group IIA elements, ethanol amines, organic acids such as acetic acid, sequestering agents, and chelants to inhibit precipitation caused by mono- and polyvalent metal ions that may build up in the coating solution.

One object of the invention is to provide improved Group IV-A conversion coatings for steel, magnesium and aluminum that are both highly corrosion resistant and simultaneously serve as an adhesion promoting paintbase. This is characteristic of chromate conversion coatings, but environmentally safe silicate coatings generally reduce paint adhesion.

An additional benefit of the invention is that the coating is formed from an aqueous solution with no organic solvents used. This eliminates the disposal and emission considerations involved in producing zirconates and other metal oxide-containing coatings from sol-gel applications, while providing a broad spectrum replacement for chromates.

Further objects and advantages of the present invention will be apparent from the following description and accompanying drawing.

BRIEF DESCRIPTION OF THE DRAWING

FIG. 1 schematically illustrates attachment/activation of zirconate to aluminum oxide.

DESCRIPTION OF THE PREFERRED EMBODIMENT

For the purpose of promoting an understanding of the principles of the invention, reference will now be made to preferred embodiments and specific language will be used to describe how to make the best mode of the invention. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

As indicated above, the present invention relates generally to chromate-free compositions and processes which provide a highly corrosion resistant, environmental barrier coating on the surface of metal substrates and other surfaces; an example of which is described in NASA Tech Briefs, January, 1998, p. 68. It is believed that the most significant source of protection comes from a Group IV-A oxide matrix. The matrix that is formed is analogous to a siloxyl network. Such siloxyl networks have been shown to be produced from alkaline silicate solutions upon their contact with an acidic surface followed by drying. Zirconium will be used here as an example for the group. The zirconium-based matrix is formed when the compositions are dried onto a surface. A zirconyl matrix will be composed of —O—Zr[—O—]$_3$—Zr[—O—]$_3$—Zr[—O—]$_3$ structures that make up a three dimensional "zirconate polymer."

The invention is believed to be most efficacious when two or more stages are used. The fluoride-free or low fluoride zirconate solution is the final stage and it is preferred that no rinse be used prior to drying. Stages prior to the zirconate are included to prepare the substrate surface by cleaning and/or activation. The activation can include deoxidization, application of other types of coatings (chromate, or chromate-free as proposed in FIG. 1 for a zirconium fluoride attachment to an aluminum oxide surface) or a simple cleaning (with a cleaning agent such as a surfactant or a solvent degrease) or activation treatment of the naturally occurring oxide that exists on most metals. It is preferred that the surface be clean and the natural oxide remain intact prior to the present invention's application (and be activated in some fashion) as it will promote additional protection from a corrosive environment. It is preferred that the cleaning stage be the activation stage or to be the stage prior to the activation stage.

A multiple stage process is preferred, as improved bonding of the zirconyl matrix to the surface will be obtained when there has been an activation stage. The most preferred is a three stage process wherein the first stage contains zirconium and fluoride and the second stage contains and oxidizing agent. It is preferred that the oxidizing agent be one that is oxygen-containing, such as chlorate ion. The fluoride acts to activate the metal oxide surface and the zirconium bonds, facilitating the subsequent zirconyl film formation and attachment. It is believed that the oxidizing agent promotes formation of the metal oxide matrix by serving as a source of oxygen for the Group-IVA metal to bond to in the ensuing fluoride-free Group IV-A stage (referred to as a "zirconyl stage" here, but "titanyl" and "hafinyl" are generally applicable as well). Results in neutral salt spray (Table 3) have demonstrated that use of an oxidizing stage (10 g/L NaClO$_3$ at pH=4.0 and 180° F.) can extend the period to onset of pitting by three-fold as compared to same processing without an oxidizer-containing stage. This has been shown to be particularly effective with copper-containing alloys of aluminum such as 2024 T3.

A thorough deionized rinse prior to the final "zirconyl stage" is most desirable. Contamination of the "zirconyl stage" with prior treatment solutions is to be avoided as they may induce premature gellation when rising to excessively high levels. This is to be avoided, as the treatment bath will be induced to completely and irreversibly gel in the treatment tank.

In one aspect of the present invention, a corrosion resistant conversion coating is provided comprising a Group IV-A metal such as titanium, zirconium or hafnium and an oxyanion such as nitrate, sulfate, acetate, etc.; or haloanion such as chloride; that will coordinate with zirconium but not form stable covalent metal-anion bonds. The pH of the solution is preferably below about 5.0, preferably between about 1.0 and about 4.0, and most preferably between 1.5 and 3.5. To adjust the pH to lower levels, it is preferred to use the corresponding acid of the anion, and to raise the pH of a solution, it is preferred to use a metal-free base. At increasing pH values, Group IV-A elements tend to form higher order hydroxides through hydrolysis. In the prior art, fluoride anion has been used to compete with hydroxides and hydroxide donors to inhibit formation of Group IV-A metal hydroxides. The stabilizing anions become displaced and various hydroxide species form according to the following reaction, as seen, for example, for zirconium:

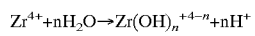

The higher order hydroxide will, in turn, tend to form ZrO$_2$ which is undesirable because it is insoluble. At a pH of about 4.5 to 5.0 or higher, Zr(OH)$_4$ begins to increasingly predominate, leading to the formation of zirconium oxide through a dehydration reaction. Higher levels of acid in solution (low pH values) push the equilibrium of this reaction to the left and, with sufficient anion(s) present, Zr$^{4+}$ remains soluble in solution and does not precipitate as the oxide (ZrO$_2$) formed by hydrolysis and dehydration.

A proton from an acid can be considered to be competitive with the zirconium ion for a hydroxyl unit, yielding water and a soluble zirconium/hydroxyl/anion complex. This can be expressed by (with OA representing an oxyanion or other nonfluoride anion):

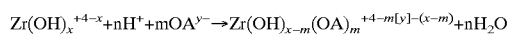

Addition of an acid such as nitric is ideal for this as hydrogen ion is added along with nitrate, so, for example:

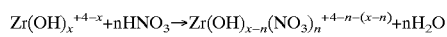

Without high levels of fluoride, the acid and coordinating anion levels must be kept such that the pH is below about 5.0 and the anion is maintained at a level that it helps to form a soluble coordinate complex with the Group IV-A metal. The nature of the anion is important as relatively weak Lewis bases will coordinate with the metal but also allow it to easily form a coating when exposed to a substrate surface. So, the one oxyanion that is undesirable to add directly in these applications is the very strong Lewis base of hydroxide ion, as it will consume hydrogen ion and begin to compete with the preferred anions for coordination or attachment to the Group IV-A metals. This competition becomes increasingly strong (or more favorable) for hydroxide as pH goes up, reflecting a higher hydroxide concentration (and lower hydronium ion) and, therefore, higher probability of higher order Group IV-A metal hydroxides forming. This, in turn, leads to premature gellation or formation of the insoluble dioxides ($TiO_2$, $ZrO_2$ and $HfO_2$) through dehydration reactions.

The source of the oxyanion may be from various salts such a potassium nitrate, potassium nitrite, sodium sulfate, sodium acetate and others, but it is preferred that the solution have minimal levels of cations (such as potassium), other than those from Group IV-A. Likewise, if a haloanion or other preferred anion is to be used, similar Group IA salts are suitable as is dissolution of a fluoride-free Group IV-A salt in the haloacid (such as HCl, HBr, HI, etc.) Therefore, preparation of a zirconium solution should be performed with zirconium in the form of the carbonate or other relatively pure form such as the metal in combination with the acid form of the anion. Nitric acid, sulfuric acid, boric or acetic acid and other "O- donor" acids are suitable for combining with forms such as the carbonate (as are the previously mentioned haloacids). Solubilities and reaction times will depend upon the acid used. Nitric or hydrochloric acid will react quickly and give high solubility, whereas boric acid will react slowly and give low solubility. Nitrates, sulfates and other salts of Group IV-A metals are available and may be used while subsequently lowering pH, when necessary, using the corresponding acid. Increasing pH is preferably done using a metal-free base, preferably an organic oxygenaceous or nitrogenous Lewis base. Use of Tris is preferred in one embodiment as it will act as a chelant as well as a buffer. Use of the corresponding oxyacid with carbonates of Group IV-A metals is most preferred.

As indicated, the Group IV-A metal may be titanium, zirconium or hafnium. In most applications zirconium is used, due primarily to its commercial availability and lower cost. Additionally, solutions prepared with titanium would generally have to be more dilute than zirconium and hafnium due to its lower solubility.

The levels of acid, anion, and chelants such as ethylenediaminetetraaccetic acid, which is commonly available under the trade name of Versenex®, are maintained to keep the metals in solution.

As silicates tend to gel readily below a pH of 10, it is expected that the Group IV-A elements in the presence of non-fluoanions will behave analogously above a pH of about 4.5 to 5.0. Therefore, to be in a pH range where gellation is facilitated yet the solution is stable, a pH of 1.0 to 4.0 will be most appropriate. As with silicates, the presence of cations (particularly polyvalent) promotes gellation and are acceptable in the coating solution to a limited extent, but are preferred to be introduced to the surface of the treated substrate prior to its exposure to the present invention. Therefore, in one embodiment, a pretreatment stage is used to accomplish this.

As with most conversion coatings, an elevated temperature of the treatment solution accelerates coating deposition. Silicates at 10% by weight in water have shown to form a coating in less than five minutes from 70 to 120° F. The higher temperature ensures completeness of reaction and a range of 100 to 130° F. is preferred in one embodiment of the present invention. Appropriate working solution temperatures for particular applications may be selected by persons skilled in the art and are not limited to the ranges described herein.

Acceptable coatings will form from solutions up to the solubility limit of the metals at a given pH. In the preferred range of pH, the best levels can be determined without undue experimentation by persons skilled in the art. In one embodiment, the coating will form with zirconium at $2.0 \times 10^{-1}$ M and nitrate at $2.0 \times 10^{-1}$ M. The best concentration of metal, nitrate, pH, and organic base will depend upon working bath temperature, method of application, substrate, etc.

Additional inorganic components may be added to enhance particular characteristics, such as paint adhesion or more rapid coating deposition. These would include phosphates, tannins, various metal cations and organic acids. Addition of oxides of elements such as tungsten may be useful in certain applications as they will incorporate into the matrix and modify the thermal stress characteristics of the coating. Studies of zirconium-tungsten oxides have shown geometric expansion upon cooling which can relieve stress crack formation in the coatings as they cool when they are dried at elevated temperature. Use of any additive will need to be balanced with how it destabilizes the coating solution. Silicates added would tend to destabilize the solutions even at near trace levels; this presents problems in preparing concentrates of the compositions. Silicates may be added to their "solubility" limits, but these levels are generally so low as to render the addition to be of no effect.

One class of organic additives which have shown to be useful in several ways is that of oxygenated water-soluble compounds. Of particular benefit been are organic oxygenates which are hydoxylated. Examples include BASF 1,6 hexanediol, Arcosolv® PTB and Air Products and Chemicals' Airvol® 125 polyvinyl alcohol (PVA). It is believed the hydroxyl functionality reacts with the Group IV-A hydroxylate and copolymerizes in to the metal-oxide matrix. This lends improved geometric stress tolerance of the coatings and increases the hydrophobic nature if the matrix. Of particular benefit are the highly hydrolyzed polyvinyl alcohols, one of which is mentioned above. The Group IV-A coatings disclosed here are typically used as "dry-in-place" compositions. This can lead to "puddling" of the coating where it drains to during drying. When an organic hydroxylate is added, the heavier "puddled" area does not show discontinuity features sometimes seen in the Group IV-A oxide matrix polymers produced with the compositions in the present invention without these organics. These compositions lend considerably improved paint adhesion, with marginally improved corrosion protection, at very low Group IV-A concentrations. They can be effective even when the Group IV-A metal is at micromole ($1.0 \times 10^{-6}$) per liter levels. Corrosion resistance has been show to as much as double with use of PVAs in the present compositions, with as little as 0.0125 weight percent being highly effective. The drawback to their use is that sufficient drying to permit further processing usually must occur at elevated temperature or corrosion protection is compromised. Whereas optimum protection can be had by drying at ambient with compositions void of the organic hydroxylates, temperatures up to 350° F. are indicated for systems with them. This is, naturally, due to the extra energy required to drive the metal hydroxylate to organic hydroxylate condensation through dehydration reaction.

Generally, as with other zirconate type coatings, where higher levels of acid help to maintain solubility of bath components, additional acid may be needed to stabilize the coating solution. Incorporation of stannates is also attractive as a structural component and should be of particular value when treating ferrous alloys. While the invention is directed at producing alternatives to coatings containing fluorides and/or chromates, a small amount of chromium may be added as chromate to improve aspects of the coating. Addition should be at levels which do not impact the hazard class of the waste generated from processing. This level is currently about 5 ppm chromium.

Working solutions composed of mixture(s) of the above components may be applied by spray, dip, and roll coat application. After the coating has been allowed to form, it may be rinsed, but a "no-rinse" process is preferred. The Group IV-A components that remain on the surface and are not rinsed off will become incorporated into the coating as it dries. There is an additional benefit in that coating components in solution are not rinsed into the waste stream of the processing facility. A chemical treatment stage may be used after the described treatment to further modify the coating's characteristics. This could include silicating, a sequence of Group IV-A coatings, among others.

It is appreciated that siccative coatings which form an organic barrier may also be necessary for decorative or other finishing characteristics of the product. The adhesion will be far superior to that seen with silicates as the resultant surface will be acidic rather than alkaline, and fluorozirconates are commonly coated on metals to improve paint adhesion, particularly adhesion of oxygenated polymers such as epoxies and esters. Many of these finishes are commonly applied through electrostatic (e-coat) means. As with conventional application methods, improved adhesion performance would be expected in electrostatic applications.

Reference will now be made to proposed specific examples and how each would improve performance in several applications. It is to be understood that the examples are provided to more completely describe preferred embodiments, and that no limitation to the scope of the invention is intended.

EXAMPLE 1 (E1)

A zirconate conversion coating solution was prepared with distilled water as follows.
Zirconium carbonate in 100 mL distilled water (55 grams of $3ZrO_2.CO_2.xH_2O$ [assay ~ 40% as $ZrO_2$] providing approximately 16.2 grams zirconium) and nitric acid (10 mL of 42° Be, at ~67.2% w/w providing approximately 9.3 grams nitrate) were mixed with gentle warming. After the carbonate was completely dissolved, the pH of this solution was less than 1.0. The solution was brought up to 1.0 liter with distilled water. The final pH of this solution was approximately 1.7. This solution was used at 120° F.

EXAMPLE 2 (E2)

A solution was prepared as in EXAMPLE 1 along with tris(hydroxymethyl)aminomethane (5.0 grams) to yield a solution having a final pH of approximately 2.4. This solution was used at 120° F.

EXAMPLE 3 (E3)

A solution was prepared as in EXAMPLE 1 using one fifth the levels zirconium carbonate and nitric acid along with 5.0 grams tris(hydroxymethyl)aminomethane. The resulting pH was approximately 3.0. This solution was used at 120° F.

The solutions in EXAMPLES 1 to 3 were used to coat aluminum 3003 panels. Panels were pretreated with the following solutions for five minutes. Pretreated panels were either rinsed in distilled water and then dried (controls) or rinsed in distilled water, treated with one of each of the above Example solutions and dried. All panels were dried at 225° F. for five minutes. Temperatures and other conditions are given with each.

Pretreatment A (PA)

Distilled water soak at 70° F. for five minutes.

Pretreatment B (PB)

A soak at 70° F. for five minutes in a solution of potassium fluoride (1.2 grams per liter) and 42° Be nitric acid (approximately 0.5 mL) at a pH of about 2.8 in distilled water.

Pretreatment C (PC)

A soak at 120° F. for five minutes in the following solution. A mixture brought to one liter with distilled water and 0.5 gram $K_2ZrF_6$, 0.2 grams $Na_2B_4O_7.5H_2O$, and 0.3 grams sodium tripolyphosphate. The pH of this solution was brought to about 2.8 with approximately 0.20 mL 42° Be nitric acid.

All panels were dried as described above. Treatment codes are given in Table 1 below. Panels coated with each pretreatment and combined pretreatment/Example 1, 2, or 3 were tested bare and painted. Tests included seven days (168 hours) exposure to neutral salt spray according to ASTM B-117 and paint adhesion before and after 168 hours of salt spay exposure according to ASTM D-3359 (ratings range from 5 [no loss of adhesion] to 0 [greater than 65% adhesion loss]) using a 1.5 mm crosshatch tool. Results are given in Table 2 below. Painted panels were sprayed with an enamel paint and allowed to air dry for 30 minutes. Thereafter the panels were dried in an oven at 170° F. for 15 minutes to fully cure the paint.

TABLE 1

Treatments

| Coating Code | Pretreat A | Pretreat B | Pretreat B | EXAMPLE 1 | EXAMPLE 2 | EXAMPLE 3 |
|---|---|---|---|---|---|---|
| PA | 1 | — | — | — | — | — |
| PA/E1 | 1 | — | — | 2 | — | — |
| PA/E2 | 1 | — | — | — | 2 | — |
| PA/E3 | 1 | — | — | — | — | 2 |
| PB | — | 1 | — | — | — | — |
| PB/E1 | — | 1 | — | 2 | — | — |
| PB/E2 | — | 1 | — | — | 2 | — |
| PB/E3 | — | 1 | — | — | — | 2 |
| PC | — | — | 1 | — | — | — |
| PC/E1 | — | — | 1 | 2 | — | — |
| PC/E2 | — | — | 1 | — | 2 | — |
| PC/E3 | — | — | 1 | — | — | 2 |

TABLE 2

Test results for corrosion and adhesion

| Coating Code | % Pitting over panel after exposure to neutral salt spray according to ASTM B-117 | | | Crosshatch adhesion according to ASTM D-3359 | |
|---|---|---|---|---|---|
| | 1 day | 3 days | 7 days | Before Salt Spray Exposure | After Salt Spray Exposure |
| PA    | 40 | 80  | 100 | 4 | 2 |
| PA/E1 | 0  | 20  | 40  | 5 | 5 |
| PA/E2 | 0  | 0*  | 0*  | 5 | 5 |
| PA/E3 | 0  | 0   | 0   | 5 | 4 |
| PB    | 60 | 100 | 100 | 5 | 4 |
| PB/E1 | 10 | 20  | 50  | 5 | 5 |
| PB/E2 | 10 | 30  | 50  | 5 | 5 |
| PB/E3 | 10 | 30  | 60  | 5 | 4 |
| PC    | 10 | 60  | 100 | 4 | 3 |
| PC/E1 | 0  | 0*  | 0*  | 5 | 5 |
| PC/E2 | 0  | 0   | 0*  | 5 | 5 |
| PC/E3 | 0  | 0   | 0   | 5 | 3 |

Panels show spots that evidence some potential disruption, but no distinct pits have formed.

TABLE 3

Results for onset pitting, in neutral salt spray, with and without an oxidizer-containing stage prior to a fluoride-free Group IV-A treatment. All processing was identical except the use of an oxidizer in Process 2.

| Process | Activating Stage Containing $K_2ZrF_6$ | Oxidizer-containing Stage with $NaClO_3$ | Fluoride-free zirconyl Stage | Days to onset of pitting on 2024 aluminum |
|---|---|---|---|---|
| 1 | Yes | No  | Yes | 1 |
| 2 | Yes | Yes | Yes | 3 |

I claim:

1. A process for coating a metal or other solid surface with a Group IV-A oxide matrix yielding environmental and corrosion protection comprising the steps of:
   A) applying to said surface an aqueous coating composition including:
   a) between about $1.0 \times 10^{-6}$ moles per liter and 2.0 moles per liter, based on the aqueous composition, of dissolved Group IV-A metal ions selected from the group consisting of titanium, zirconium and hafnium alone or in combination,
   b) an anion selected from the group consisting of:
      I. an oxyanion, or
      II. a non-oxyanion with an absolute charge-to-radius ratio value less than that of fluoride anion (0.735), or
      III. a combination thereof, and
   c) sufficient hydrogen ion to maintain the solution below a pH of about 5.0,
   d) fluoride atoms which are present in a ratio of zero to two fluoride atoms per Group IV-A metal ion, and
   e) water, the process forming a Group IV-A oxide matrix on the surface on which the process is implemented; and,
   B) rinsing or drying the coating composition sufficiently to permit any further processing.

2. A process according to claim 1, wherein said composition further comprises at least one metal or metalloid oxide.

3. A process according to claim 1 or 2, wherein said composition further comprises at least one organic oxygenate.

4. A process according to claim 1 further comprising the step of pre-treating the surface with a composition containing an oxidizing agent.

5. A process according to claim 4 wherein the oxidizing agent in the oxidizing composition is oxygenated.

6. A process according to claim 4 wherein the oxidizing agent is a chlorate.

7. A process according to claim 1 further comprising the step of activating the surface prior to the application of the coating composition.

8. A process according to claim 7 wherein the activation step includes deoxidization.

9. A process according to claim 7 wherein the activation step includes application of a coating.

10. A process according to claim 9 wherein said activation coating includes a chromate coating.

11. A process according to claim 7 wherein the activation step includes application of a chromate-free coating.

12. A process according to claim 7 wherein said activation step includes application of a Group IV-A fluoride.

13. A process according to claim 7 wherein said surface includes naturally occurring metal oxides and wherein the activation step includes application of a fluoride treatment of the naturally occurring oxide on said surface.

14. A process according to claim 7 further comprising the steps of rinsing said surface with water after the activation step.

15. A process according to claims 1 or 2 further comprising the step of cleaning said surfaces prior to application of the coating composition.

16. A process according to claim 1 wherein the rinsing or drying step comprises the step of rinsing said surface with water after application of the coating composition.

17. A process according to claims 1 or 2 wherein the coating composition is applied by dip, spray or rollcoat methods or any combination thereof.

18. A process according to claims 1 or 2 further comprising the step of applying an electrostatic coating subsequent to the application of the coating composition.

19. A process according to claims 1 or 2 wherein the applied coating composition further includes fluoride ion in a mole ratio of less than two fluoride atoms per Group IV-A metal atoms.

20. A method of treating a surface for enhancing environmental or corrosion protection or paint adhesion comprising the steps of:
   A) activating the surface with at least one of the following substeps:
      cleaning said surface with a surfactant-based cleaner or solvent degrease to form a cleaned surface,
      applying a chromate-free coating,
      applying a chromate coating,
      applying a silicate coating,
      deoxidizing the surface,
      applying a zirconium fluoride coating, and
      applying a phosphate, to form an activated metal or metal oxide surface;
   B) applying to said activated surface an aqueous coating composition including:
      a) between about $1.0 \times 10^{-6}$ moles per liter and 2.0 moles per liter, based on the aqueous composition, of dissolved Group IV-A metal ions selected from the group consisting of titanium, zirconium and hafnium alone or in combination,
      b) an anion selected from the group consisting of:
         I. an oxyanion, or
         II. a non-oxyanion with an absolute charge-to-radius ratio value less than that of fluoride anion (0.735), or III. a combination thereof, c) fluoride ion in a mole ratio of less than two fluoride atoms per Group IV-A metal atom, d) sufficient hydrogen ion to maintain the solution below a pH of about 5.0, and e) water, the process forming a Group IV-A oxide matrix on the surface on which the process is implemented; and, C) rinsing or drying the coating composition sufficient to permit any further processing.

21. A method according to claim 20 further comprising the step of pretreating the surface with a composition containing an oxidizing agent.

22. A method according to any one of claims 1, 2, or 20 further comprising the step of applying a polymer overcoat to said surface subsequent to the application of the coating composition.

23. A method according to any one of claims 1, 2 or 20 further comprising the step of applying a silicate overcoat to said surface subsequent to the application of the coating composition.

24. A process according to claim 2, wherein the metal or metalloid oxide is selected from the group consisting of borates, stannates, phosphates, silicates, chromates, and tungstates.

25. A process according to claim 3, wherein the organic oxygenate is selected from the group consisting of hydroxylated organic compounds.

26. A process according to claim 25, wherein the organic oxygenate is a hydroxylated organic compound selected from the group consisting of polyvinyl alcohols.

* * * * *